UNITED STATES PATENT OFFICE.

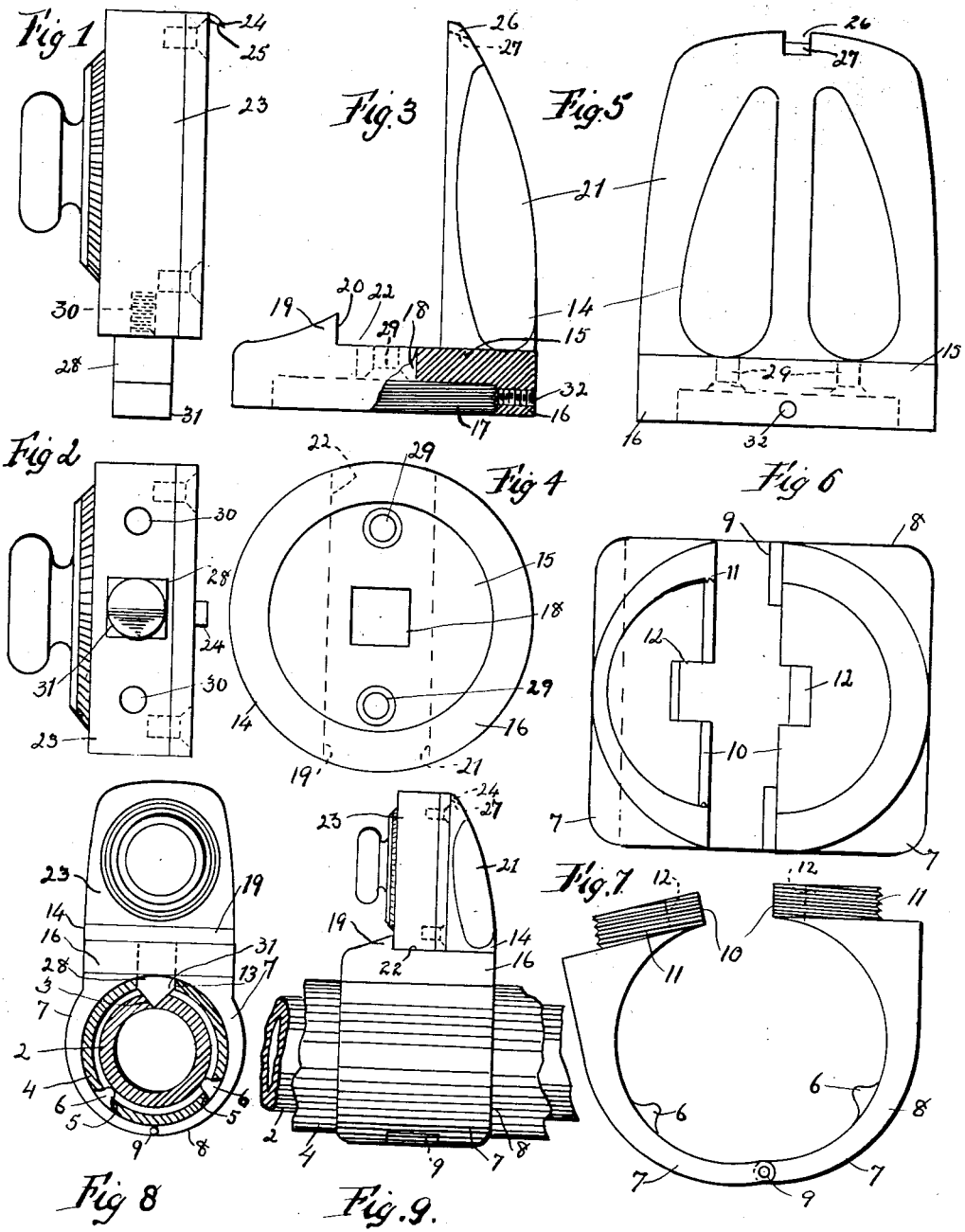

FLETCHER O. BOSWELL, OF PHILADELPHIA, PENNSYLVANIA.

AUTOMOBILE-LOCK.

1,302,502.  Specification of Letters Patent.  Patented May 6, 1919.

Application filed February 18, 1918. Serial No. 217,971.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Locks, of which the following is a specification.

My invention relates to new and useful improvements in automobile locks, and has for its object to provide a device of this character consisting of form parts and which may be readily and quickly applied to the casing or sleeve of the steering post of an automobile whereby the steering post proper may be locked against rotation.

A further object of the invention is to provide an exceedingly simple and effective automobile lock which will be relatively small and compact, although strong and durable and which will be neat in appearance and further which may be so positioned or located upon the steering post casing that the same will not be an obstruction to the operator of the automobile or the proper manipulation of the steering mechanism.

A still further object of the invention is to provide a clamp adapted to be placed about the casing or sleeve of an automobile steering post, said clamp being provided with means for registration with holes in said casing or sleeve and being held in position by a lock supporting member carrying a suitable combination lock, the locking bolt of which is adapted to register with a keeper cavity in the steering post after said bolt has passed through a hole in the sleeve thereby locking the steering post against rotation to prevent the unauthorized use of the automobile.

Another object of the invention is to so construct the device that three bearing or contact points will be provided on the steering post to prevent disfigurement of the casing or sleeve.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Figure 1, is a side elevation of a combination lock of any desirable or well known construction, the casing being provided with certain elements to adapt its application to the parts of my invention.

Fig. 2, is a bottom or inner end view thereof.

Fig. 3, is a side elevation of the lock supporting member, a portion thereof being shown in section to clearly illustrate the construction.

Fig. 4, is an end view thereof.

Fig. 5, is a side elevation at right angles to Fig. 3.

Fig. 6, is a side elevation of the clamp in a partial open position.

Fig. 7, is an end view thereof.

Fig. 8, is a plan or end view of the completed device on a reduced scale showing its application to a steering post, said steering post and its sleeve or casing being shown in section, and Fig. 9, is a side elevation thereof.

In carrying out my invention as here embodied 2 represents the rotatable steering post of an automobile or other similar vehicle provided with a manually operated steering gear and this steering post is provided with a keeper cavity 3 adapted to receive a lock bolt as will be hereinafter described. The steering post 2 is surrounded by a stationary casing or sleeve 4 and has two holes 5 therein with which register the projections 6 one of which is carried by each of the members 7 of the clamp 8, said members being hinged together in any suitable manner as at 9. The members of the clamp are arcuate in cross section and form approximately one-half of the ring or circle, the inner circumference of which is approximately the same as the outer circumference of the sleeve or casing 4 and at the free ends of these members or at their meeting edges is located a semicircular lug 10, each provided on its arcuate surface with threads 11 so that when the clamp members are closed a complete circular lug is produced having external peripheral threads and through these lugs is formed a channel 12 which when the clamp is closed forms a lock bolt opening, square in cross section which alines with a similarly shaped opening 13 in the casing or sleeve 4 and also with the keeper cavity 3 in the steering post when the latter is at rest or in a position to be locked.

When the clamp 8 is in position about the steering post casing or sleeve the projections 6 pass through the holes 5 and lightly bear against the outer surface of the steering post 2 so that when the steering post is locked, as hereinafter described, there will be three points of the locking device bearing on the steering post which will prevent any diametrical movement of the locking device relative to the steering post thereby preventing the denting or other disfigurement of the sleeve or casing should the locking device be inadvertently hit by an object such, as for instance, a tool.

In Figs. 3, 4 and 5 are shown the details of construction of the lock supporting member 14 which comprises a body 15 having a flange 16 provided with internal threads 17 whereby said lock supporting member may be mounted on the semicircular lugs of the clamp and through the body of said lock supporting member is formed an opening 18 square in cross section which is adapted to register with the channel 12 through the members of the clamp and the body of said lock supporting member is formed an enlargement 19 having a straight flat inner face 20 and spaced from said enlargement is an extension or bracket 21 leaving between it and the enlargement a channel 22 in which sets the lock 23, the casing thereof being approximately the same shape and size as the extension or bracket 21 and the outer end of said casing is provided with a lug 24 having an undercut or beveled face 25, said lug adapted to register with a notch 26 in the outer end of the extension or bracket 21, while the undercut or beveled face 25 thereof engages the inclined or beveled inner face 27 of the notch 26.

When the lock 23 is in place upon the lock supporting member, the lock bolt 28 is in registration with the opening 18 while the lug 24 is in the notch 26 and said lock is securely held in place by suitable fastening means such as screws which pass through screw holes 29 in the body 15 of the lock supporting member and in the holes 30 in the lock casing and when the screws are threaded home, the lock will be drawn into position and because of the undercut face 25 of the lug 24 and the inclined face 27 of the notch 26, said lock will be drawn snugly against the extension or bracket 21 thereby preventing any movement of the lock and overcoming the possibility of rattling.

The lock bolt 28 is preferably square in cross section at least throughout a portion of its length while the outer end thereof may be circular as at 31, the throw of the lock bolt may not be sufficient to entirely withdraw the same from the channels 12 when in its unlocked position.

The lock is secured to the lock supporting member as above described and the clamp is then placed about the casing or sleeve of the steering post in the position desired and closed about said casing or sleeve after which the lock supporting member is threaded on the semicircular lugs 10 thus securely fastening the clamp in position and the revolution of the lock supporting member may be accomplished since the circular portion 31 of the lock bolt is the only part thereof projecting into the channels 12 and when the lock supporting member is in place it may be held against accidental displacement by a suitable holding means such as a screw which is threaded through the hole 32 in the flange 16 with its inner end impending on the threads of one of the semicircular lugs 10, but when the lock bolt 28 is in the position shown in Fig. 8, the square portion 28 thereof will also project into the channels 12 thereby preventing the rotation of the lock supporting member even though no fastening through is sufficient for the same or when said fastening member has been removed from the hole 32 thereby preventing the removal of the locking device.

In practice when it is desired to lock the steering post to prevent the rotation thereof, the steering post is moved to a predetermined position which will bring the keeper cavity 3 in alinement with the opening 13 in the steering post casing then the combination lock is actuated in the ordinary manner and the lock bolt caused to engage the keeper opening 3 thereby effectively locking the steering gear so that the automobile may not be used. Any one knowing the proper combination of the lock such as the owner of the automobile or trusted persons, can actuate said lock in the ordinary manner and cause the lock bolt to be withdrawn from the keeper cavity in the steering post at which time the steering gear may be operated.

When the lock bolt is in its unlocked position, the device may be removed from the steering post by withdrawing the locking means from the hole 32 after which the lock supporting member may be revolved in the proper direction to remove it from the lugs 10 thereby permitting the opening of the clamp and its removal from the steering post.

From the foregoing, it will be seen that a very simple automobile lock is provided which may be readily and quickly applied to differently constructed automobiles, so long as some portion of the steering gear is rotatable during the steering operations and as the combination of locks of the character described herein can be changed, a different combination can be provided each time the automobile changes hands or when it becomes necessary to employ a different chauffeur, so that the previous chauffeur will be unable to operate the automobile should he desire to do so after leaving the employ of the owner of the automobile provided with my improved automobile lock.

Of course I do not wish to be limited to the exact details of construction as herein shown as these may be varied within the limits of the appended claims without departing from the spirit of my invention.

Having thus fully described my invention what I claim as new and patentable is:—

1. In combination a vehicle steering post provided with a keeper cavity, a casing surrounding said post, said casing having an opening therein with which the keeper cavity is adapted to aline, a clamp comprising two hinged members, a semicircular lug at the free meeting edge of each member having threads on its arcuate portion, said lugs having channels therein, said channels alining with the opening in the casing, a lock support having threaded engagement with the semicircular lugs for holding the clamp closed and a combination lock carried by the lock support, the bolt of said lock registering with the channels, the opening in the casing and the keeper cavity in the steering post for locking the latter.

2. In combination a vehicle steering post provided with a keeper cavity, a casing surrounding said post, said casing having an opening therein with which the keeper cavity is adapted to aline, a clamp comprising two hinged members, a semicircular lug at the free meeting edge of each member having threads on its arcuate portion, said lugs having channels therein, said channels alining with the opening in the casing, a lock support comprising a body having threaded engagement with the semicircular lugs for holding the clamp closed, said body having an opening therethrough adapted to aline with the channels, an extension or bracket projecting from said body and a lock attached to the extension or bracket and secured to the body, the bolt of said lock registering with the opening of said body, the channels, the opening in the casing and the keeper cavity for locking the steering post against rotation.

3. In combination a vehicle having a steering post provided with a keeper cavity, a stationary sleeve or casing surrounding said steering post, said casing having holes therein and an opening square in cross section, the keeper cavity adapted to aline with said opening when the steering post is to be locked against rotation and a clamp comprising two hinged members each having a projection adapted to register with the holes in the casing when the clamp is placed thereabout and a semicircular lug at the free meeting edge of each member, said lugs having a channel therein of such configuration as to form a square opening when the clamp is closed, said channels alining with the opening in the casing, a lock support surrounding the semicircular lugs for holding the clamp closed and a lock carried by said lock support and provided with a bolt, a portion of which is square in cross section, said bolt passing through the lock support, the channels, the opening in the casing and registering with the keeper cavity for locking the steering post.

4. In combination a vehicle having a steering post provided with a keeper cavity, a stationary sleeve or casing surrounding said steering post, said casing having holes therein, an opening square in cross section, the keeper cavity adapted to aline with said opening when the steering post is to be locked against rotation and a clamp comprising two hinged members each having a projection adapted to register with the holes in the casing when the clamp is placed thereabout and a semi-circular lug at the free meeting edge of each member, said lugs having a channel therein of such configuration as to form a square opening when the clamp is closed, said channels alining with the opening in the casing, a lock support comprising a body having a square opening therethrough, a threaded flange projecting therethrough adapted to engage the semicircular lugs of the clamp for holding the latter closed, said flange having a screw receiving opening therethrough whereby the lock support may be fastened to the clamp, an enlargement projecting from said body and an extension or bracket also projecting from said body and forming with the enlargement a channel for the reception of a lock, said extension having a notch in its outer end with an inclined or beveled face and a combination lock provided with a lug having an undercut face for registration with the notch in the extension or bracket and further provided with a lock bolt, a portion of which is square in cross section, said lock being secured to the lock support in such manner that when the lock bolt is thrown outward the square portion thereof will register with the opening in the body of the lock support, the channels of the clamp and the opening of the casing while the outer end registers with the keeper cavity to lock the steering post against rotation.

5. In combination, a steering post provided with a keeper cavity, a casing surrounding said post, said casing having an opening therein with which the keeper cavity is adapted to aline and provided with holes spaced from each other and from the opening, a clamp surrounding said casing, said clamp having projections adapted to pass through the holes and lightly bear against the steering post, a lock support carried by the clamp, and a lock on said support, the bolt of which passes through the support, clamp and casing and engages the steering post to prevent rotation of the steering post and with the clamp projections prevent diametrical movement of the locking device relative to the steering post.

In testimony whereof, I have hereunto affixed my signature.

FLETCHER O. BOSWELL.